United States Patent [19]

Hirano et al.

[11] Patent Number: 5,060,770
[45] Date of Patent: Oct. 29, 1991

[54] METHOD OF CONTROLLING ROTATIONAL SPEED OF CONTINUOUS VARIABLE TRANSMISSION

[75] Inventors: Sadayuki Hirano; Yoshinori Yamashita, both of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 588,679

[22] Filed: Sep. 26, 1990

[30] Foreign Application Priority Data

Sep. 30, 1989 [JP] Japan .................. 1-256336

[51] Int. Cl.$^5$ ............................................ F16D 41/02
[52] U.S. Cl. .............................. 192/0.032; 192/0.076; 192/82 T
[58] Field of Search ............... 192/0.032, 0.076, 82 T

[56] References Cited

U.S. PATENT DOCUMENTS 4,678,069  7/1987  Yoshimura et al. ............. 192/0.076
4,964,317  10/1990  Murano et al. .................... 74/844

FOREIGN PATENT DOCUMENTS 64-44338  2/1989  Japan .

Primary Examiner—Rodney H. Bonck
Attorney, Agent, or Firm—Flynn, Thiel, Boutell & Tanis

[57] ABSTRACT

A method of controlling the rotational speed of a continuously variable transmission having a pair of pulleys which each includes a fixed pulley member and a movable pulley member, including the steps of decreasing and increasing the groove width between each pair of fixed and movable pulley members to respectively increase and decrease the rotational radius of a belt wrapped around the pulleys. A hydraulic clutch is provided and is connected to and disconnected from the driving force of the transmission in response to clutch pressure applied thereto. A control section is provided for calculating a desired clutch pressure for the hydraulic clutch. This desired clutch pressure is based on an engine torque value and a desired engine rotational speed. When the clutch is in a normal starting mode and certain other predetermined conditions are satisfied, the control section is used to adjust the desired engine rotational speed based on the temperature of the oil in the transmission.

5 Claims, 4 Drawing Sheets

METHOD OF CONTROLLING ROTATIONAL SPEED OF CONTINUOUS VARIABLE TRANSMISSION

FIELD OF THE INVENTION

The present invention relates to a method of controlling rotational speed of a continuously variable transmission and, more particularly, to a rotational speed control method for a continuously variable transmission in which the vehicle start feeling at the start of the driving motion of the vehicle, after the engine is started at a low temperature, can be improved.

BACKGROUND OF THE INVENTION

In vehicles such as automobiles and the like, a transmission is interposed between an internal combustion engine and driving wheels. The transmission changes the driving force which is transferred from the internal combustion engine to the driving wheels and the running velocity in accordance with running conditions of the vehicle. Because such running conditions change in a wide range, the transmission makes the performance of the internal combustion engine sufficiently effective.

In a known gear type transmission, by selectively switching engaging states of a plurality of stages of gear trains, a gear ratio is changed step by step and the driving force is transferred. In a known continuously variable transmission, each of a driving side pulley and a driven side pulley has a fixed pulley member fixed to a rotary shaft and a movable pulley member which is attached to the rotary shaft so that it can come into contact with and move away from the fixed pulley member. A groove width formed between the fixed and movable pulley members of each of the driving side and driven side pulleys is decreased and increased, whereby the rotational radius of a belt reeved between both of the pulleys is respectively increased and decreased. The belt ratio is thus continuously changed, thereby transferring the driving force.

A control method for such a continuously variable transmission is disclosed in JP-A-64-44338. According to the method disclosed in the above document, in a control section which receives detection signals of various operating modes, if it is determined that the operating mode is a holding mode, then a hydraulic circuit is operated and a clutch pressure is controlled to a predetermined pressure, thereby achieving a clutch engagement state which is expected by the driver.

On the other hand, in such a control method for the continuously variable transmission, when the selected operating mode is a normal starting mode, an actual engine rotational speed is fed back and compared to an objective engine rotational speed which is linearly determined based on a throttle opening degree. The difference between the objective engine rotational speed and the actual engine rotational speed is calculated. A feed forward amount is calculated from an engine torque value which is determined based on the throttle opening degree, and an objective clutch pressure for the hydraulic clutch is calculated from (1) the aforementioned difference between the objective and actual engine rotational speeds, and (2) the feed forward amount.

When the engine is started at a low temperature, for the purpose of warming-up the engine and maintaining the normal operable state of the warmed engine, the throttle is normally opened slightly more (for instance, by about 2 to 20%) than at ordinary engine operating temperature, which engine temperature is determined in accordance with the temperature of the engine cooling water. The engine rotational speed is thereby raised to a fast idling rotational speed (for instance, 1500 to 2500 r.p.m.) at low engine temperatures. On the other hand, when the driver depresses the accelerator pedal upon starting the vehicle in motion, the hydraulic clutch of the continuously variable transmission is controlled in the normal starting mode.

However, the objective idling rotational speed in the normal starting mode has been predetermined based on ordinary engine operating temperature, and is therefore lower than the aforementioned fast idling speed. Therefore, after the engine is started at a low temperature, at the start of vehicle motion, the objective idling rotational speed corresponds to a throttle opening degree of small (warmed-up) value, and the clutch pressure is therefore controlled so as to reduce the engine rotational speed below the fast idling rotational speed. Thus, the warming-up of the engine after the start of the engine at a low temperature does not progress, and because the normal operable state of the warmed engine is insufficient at the start of vehicle motion when the engine is cold, the engine rotational speed decreases. In the worst case, the vehicle stops because of engine stall, or an abnormal over rotational speed is caused so that a shock occurs at the start of vehicle motion, and the vehicle cannot be smoothly started. As a result, the feeling associated with the start of vehicle motion is deteriorated.

It is therefore an object of the invention to provide a method of controlling the rotational speed of a continuously variable transmission, in which, after the engine is started at a low temperature, a decreased or abnormally high engine rotational speed at the start of vehicle motion can be avoided. Thus, the vehicle can be smoothly started, and the feeling of starting vehicle motion can be improved.

According to the present invention, in a method of controlling rotational speed of a continuously variable transmission in which each of a driving side pulley and a driven side pulley has a fixed pulley member and a movable pulley member which is attached to the fixed pulley member so that it can come into contact with and be moved away from the fixed pulley member, and in which the groove width between both of the fixed and movable pulley members of each of the pulleys is decreased and increased so that the rotational radius of a belt reeved between both of the pulleys is respectively increased and decreased, thereby continuously changing the belt ratio, the continuously variable transmission is characterized in that it includes a hydraulic clutch which engages with and disengages from the transmission in response to a clutch pressure to connect (and disconnect) a driving force of the transmission to (and from) a vehicle drive train. There is provided a control section for calculating an objective clutch pressure of the hydraulic clutch from (1) an engine torque value which is determined based on a throttle opening degree, and (2) an objective engine rotational speed. An actual clutch pressure in each of various control modes is set to the objective clutch pressure by the control section, and in the case where the selected control mode is a normal starting mode, if predetermined correction executing conditions are satisfied, then the control section corrects the objective engine rotational speed based on the oil temperature of the transmission.

The correction executing conditions may be: the oil temperature is equal to or lower than a predetermined temperature; the elapsed time after the start of the engine lies within a predetermined time; the throttle opening degree is equal to or smaller than a predetermined opening degree; the temperature of the engine cooling water is equal to or lower than a predetermined temperature; and the like. In the normal starting mode, if at least one of the correction executing conditions is satisfied, then the final objective engine rotational speed is calculated in accordance with the oil temperature. The objective clutch pressure is calculated from the engine torque value, which is decided by the throttle opening degree, and from the final objective engine rotational speed. The clutch pressure is controlled so that the actual clutch pressure in the normal starting mode is set to the objective clutch pressure, thereby avoiding the undesirable situation wherein, after the engine is started at a low temperature, the clutch pressure is controlled so as to reduce the engine rotational speed below the fast idling rotational speed at the start of vehicle motion. Abnormally high rotational speed is also avoided.

BRIEF DESCRIPTION OF THE DRAWINGS

An embodiment of the present invention will be described in detail hereinbelow on the basis of the drawings, in which.

DETAILED DESCRIPTION

Figure 5:
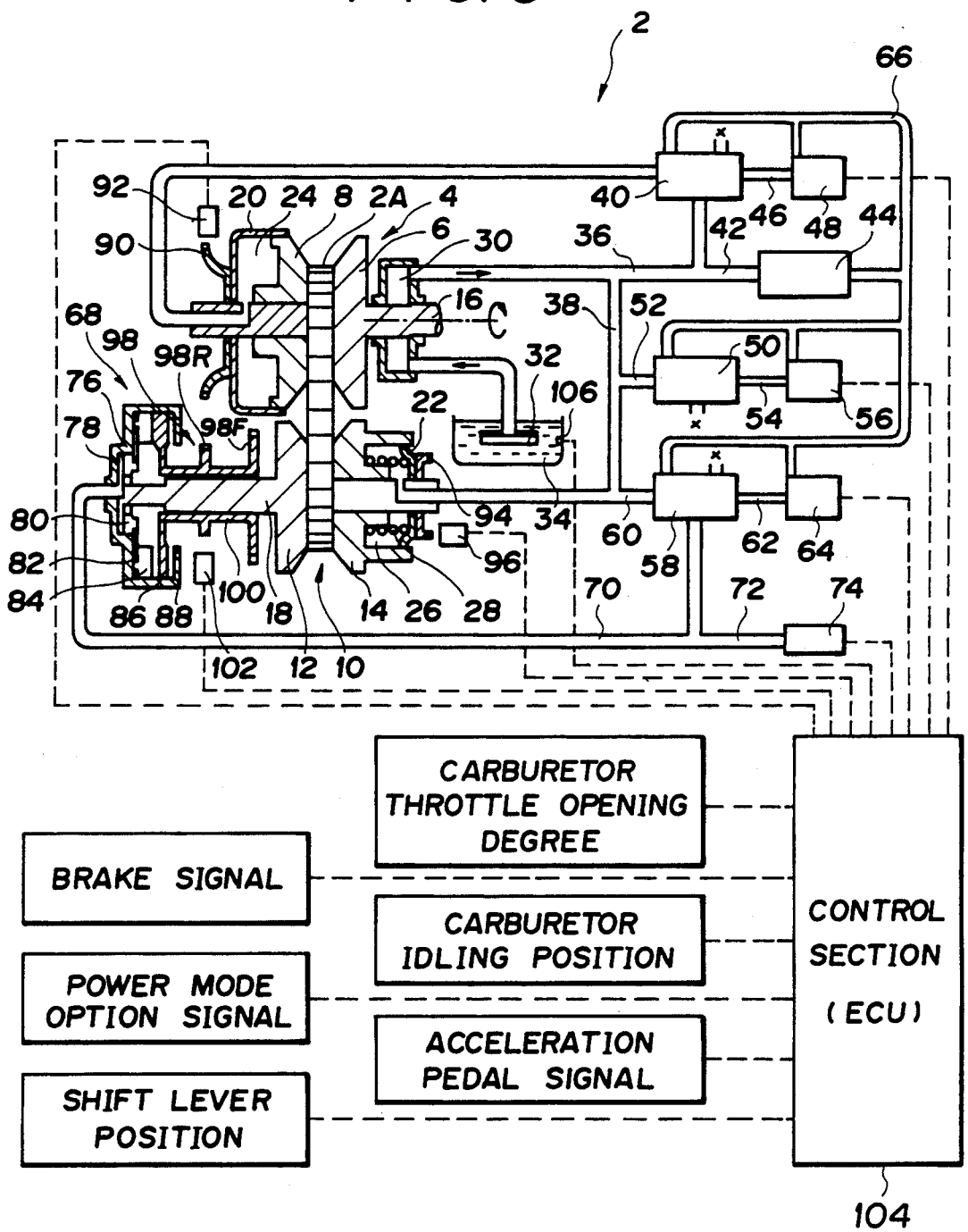
FIG. 5 is a schematic constructional diagram of a continuously variable transmission according to the present invention.

In FIG. 5, reference numeral 2 denotes a continuously variable transmission of, for instance, the belt driving type; 2A indicates a belt; 4 a driving side pulley defined by a driving side fixed pulley member 6 and a driving side movable pulley member 8; and 10 a driven side pulley defined by a driven side fixed pulley member 12 and a driven side movable pulley member 14.

The fixed pulley member 6 is fixed to a rotatable input shaft 16, and the movable pulley member 8 is attached to the input shaft 16 so as to be movable in the axial direction thereof and rotatable relative thereto. In a similar manner, the fixed pulley member 12 is fixed to a rotary output shaft 18, and the movable pulley member 14 is attached to the output shaft 18 so as to be movable in the axial direction thereof and rotatable relative thereto.

First and second housings 20 and 22 are respectively attached to the driving side movable pulley member 8 and the driven side movable pulley member 14, so that the first and second hydraulic chambers 24 and 26 are formed, respectively. A hydraulic pressure receiving area of the driving side movable pulley member 8 of the first hydraulic chamber 24 is larger than that of the driven side movable pulley member 14 of the second hydraulic chamber 26. Due to this, by controlling the oil pressure which acts on the first hydraulic chamber 24, the pulley member 8 is moved and the belt ratio is changed. On the other hand, pressing means 28 comprising a spring or the like is provided in the chamber 26 for pressing the movable pulley member 14 so as to reduce the groove width between the fixed pulley member 12 and the movable pulley member 14. When the oil pressure is low as in the case of engine start-up, the pressing means 28 sets the belt ratio to a large value on the full low side and maintains a holding force on the belt 2A, thereby preventing the belt from slipping.

An oil pump 30 is provided for the input shaft 16. The intake side of the oil pump 30 communicates with an oil pan 34 through an oil filter 32. The discharge side of the oil pump 30 communicates with the first and second hydraulic chambers 24 and 26 through first and second oil passages 36 and 38, respectively. A primary pressure control valve 40 (a speed change control valve) is arranged in the first oil passage 36. A constant pressure control valve 44 for converting a line pressure (generally, 5 to 25 kg/cm$^2$) to a predetermined control hydraulic pressure (3 to 4 kg/cm$^2$) is communicated with the first oil passage 36 between the oil pump 30 and the primary pressure control valve 40 through a third oil passage 42. A first three-way electromagnetic valve 48 to control the primary pressure communicates with the primary pressure control valve 40 through a fourth oil passage 46.

On the other hand, a line pressure control valve 50 having a relief valve function to control the line pressure communicates with the second oil passage 38 through a fifth oil passage 52. A second three-way electromagnetic valve 56 for controlling the line pressure communicates with the line pressure control valve 50 through a sixth oil passage 54.

Further, a clutch pressure control valve 58 to control the oil pressure which acts on a hydraulic clutch 68, which will be explained hereinlater, communicates through a seventh oil passage 60 with the second oil passage 38 between the second hydraulic chamber 26 and the line pressure control valve 50. A third three-way electromagnetic valve 64 to control the clutch pressure communicates with the clutch pressure control valve 58 through an eighth oil passage 62.

In order to supply the predetermined control oil pressure from the constant pressure control valve 44 to each of the primary pressure control valve 40, the first three-way electromagnetic valve 48, the line pressure control valve 50, the second three-way electromagnetic valve 56, the clutch pressure control valve 58, and the third three-way electromagnetic valve 64, the valves 40, 44, 48, 50, 56, 58, and 64 are communicated through a ninth oil passage 66.

The clutch pressure control valve 58 is communicated with a clutch hydraulic chamber 78 (which will be explained hereinlater) of the hydraulic clutch 68 through a tenth oil passage 70. A pressure sensor 74 communicates with the tenth oil passage 70 through an eleventh oil passage 72. The pressure sensor 74 can directly detect the oil pressure when the clutch pressure is being controlled in the holding mode, starting mode, or the like, and may be utilized in setting the clutch pressure to an objective clutch pressure. On the other hand, in the driving mode, since the clutch pressure is equal to the line pressure, the pressure sensor 74 also contributes to the control of the line pressure.

The hydraulic clutch 68 comprises: an input side casing 76 attached to the output shaft 18; a clutch hydraulic chamber 78 provided in the casing 76; a piston 80 which is pushed forwardly (rightwardly in FIG. 5)

by the oil pressure acting on the clutch hydraulic chamber 78; a ring-shaped spring 82 to press the piston 80 in the backward (leftward) direction; a first pressure plate 84 provided so as to be forwardly and backwardly movable by the forward pushing force of the piston 80 and the pressing force of the ring-shaped spring 82, respectively; an output side friction plate 86; and a second pressure plate 88 fixed to the casing 76.

When the oil pressure which acts on the clutch hydraulic chamber 78 is increased, the piston 80 is forwardly pushed, thereby causing the first pressure plate 84 and the second pressure plate 88 to frictionally engage the friction plate 86. Thus, the plates 84, 86, and 88 are set into a coupling or engaged state. On the other hand, when the oil pressure acting on the clutch hydraulic chamber 78 is reduced, the piston 80 is moved backward by the pressing force of the ring-shaped spring 82, thereby allowing the first and second pressure plates 84 and 88 to move away and disengage from the friction plate 86. Thus, the plates 84, 86, and 88 are set into a clutch disengaged state. As mentioned above, the hydraulic clutch 68 engages with and disengages from the transmission by the action of the oil pressure, thereby connecting (and disconnecting) the rest of the drive train to (and from) the driving force of the continuously variable transmission 2.

An input shaft rotation detecting gear 90 is arranged on the outside of the first housing 20. A first rotation detector 92 on the input shaft side is arranged near the outer periphery of the rotation detecting gear 90. On the other hand, an output shaft rotation detecting gear 94 is arranged on the outside of the second housing 22. A second rotation detector 96 on the output shaft side is arranged near the outer periphery of the rotation detecting gear 94. The engine rotational speed and the belt ratio are obtained from the rotational speeds which are detected by the first and second rotation detectors 92 and 96.

A gear 98 to transfer the transmission output is provided on the hydraulic clutch 68. The output transferring gear 98 comprises a forward output transferring gear 98F and a backward output transferring gear 98R. A third rotation detector 102 to detect a rotational speed of a final output shaft 100 is arranged near the outer periphery of the backward output transferring gear 98R. The third rotation detector 102 detects the rotational speed of the final output shaft 100 which is communicated with a forward/backward movement switching mechanism, an intermediate shaft, a last decelerating gear, a differential mechanism, a driving shaft, and wheels (which are conventional and therefore not shown), and the rotation detector 102 can detect the vehicle velocity. Because the rotational speeds on the input and output sides of the hydraulic clutch 68 are detected by the second and third rotation detectors 96 and 102, respectively, the second and third detectors also contribute to detecting and measuring clutch slip.

There is provided a control section 104 for executing the control by receiving various signals such as a carburetor throttle opening degree signal, carburetor idling position signal, an acceleration pedal signal, a brake signal, power mode option signal, a shift lever position signal, and the like, in addition to the various signals from the pressure sensor 74 and the rotation detectors 92, 96, and 102. In order to control the belt ratio and clutch engagement/disengagement in accordance with various control modes by the various input signals, the control section 104 controls the opening/closing operations of the first three-way electromagnetic valve 48, the second three-way electromagnetic valve 56, and the third three-way electromagnetic valve 64.

As will be apparent from the following discussion, the control section 104 may be embodied in a conventional microprocessor circuit.

The functions of the input signals which are input to the control section 104 will now be described in detail.

(1) Detection signal of the shift lever position

The line pressure, ratio, and clutch which are required for each range of the transmission are controlled by the range signals of P, R, N, D, L, and the like.

(2) Detection signal of the carburetor throttle opening degree

Based on this signal, the engine torque is determined from information which has previously been input into a programmable memory. The objective ratio or objective engine rotational speed is also determined on the basis of this signal.

(3) Detection signal of the carburetor idling position

The carburetor throttle opening degree sensor is corrected and the control accuracy is improved.

(4) Acceleration pedal signal

The operation of the accelerator pedal by the driver is detected by the amount of depression of the acceleration pedal, and the control method upon running or at the start of the vehicle is determined.

(5) Brake signal

The operation of the brake pedal is detected and the control direction to disconnect the clutch or the like is determined.

(6) Power mode option signal

This signal is used as an option in order to set the performance mode of the vehicle to high performance or economy performance.

(7) Oil temperature signal

This signal corresponds to the oil temperature state of the hydraulic circuit. The oil temperature signal is output to the control section 104 from, for instance, an oil temperature sensor 106 provided in the oil pan 34.

The control modes of the clutch pressure as controlled by the control section 104 include the following four fundamental patterns, 1. Neutral mode In the case of completely disengaging the clutch at the shift position of N or P, the clutch oil pressure is set to the lowest pressure (zero).

2. Holding mode

In the case where the throttle is released at the shift position of D or R and there is no desire for running (i.e. motion), or in the case where the driver desires to decelerate the vehicle during the running and to cut out the engine torque, the clutch pressure is set to a low level such that the clutch comes into contact.

3. Starting mode (special starting mode)

At start of the vehicle (normal start) or in the case of again engaging the clutch (special start) after the clutch was previously disengaged, the clutch pressure is set to a proper level in accordance with an engine generation torque (clutch input torque) such that excessive rotational speed of the engine can be prevented and the vehicle can be smoothly operated.

4. Driving mode

In the case where the clutch was completely engaged after the vehicle had been set into the perfect running state, the clutch pressure is set to a high enough level such that it can sufficiently endure the engine torque.

The control section 104 calculates the objective clutch pressure of the hydraulic clutch 68 from the engine torque value and the objective engine rotational speed, both of which are determined based on the throttle opening degree. The control section 104 controls such that the actual clutch pressure in each of the various control modes is set to the objective clutch pressure.

If predetermined correction executing conditions are satisfied when the selected control mode is the normal start mode, the control section 104 corrects the objective engine rotational speed based on the oil temperature.

The control according to the invention will now be described in accordance with FIGS. 1 to 4.

In the diagrams, the following definitions apply.
NESPC: Objective engine rotational speed
ΔNESPC: Correction engine rotational speed
NESPC': Final objective engine rotational speed.

Figure 2:
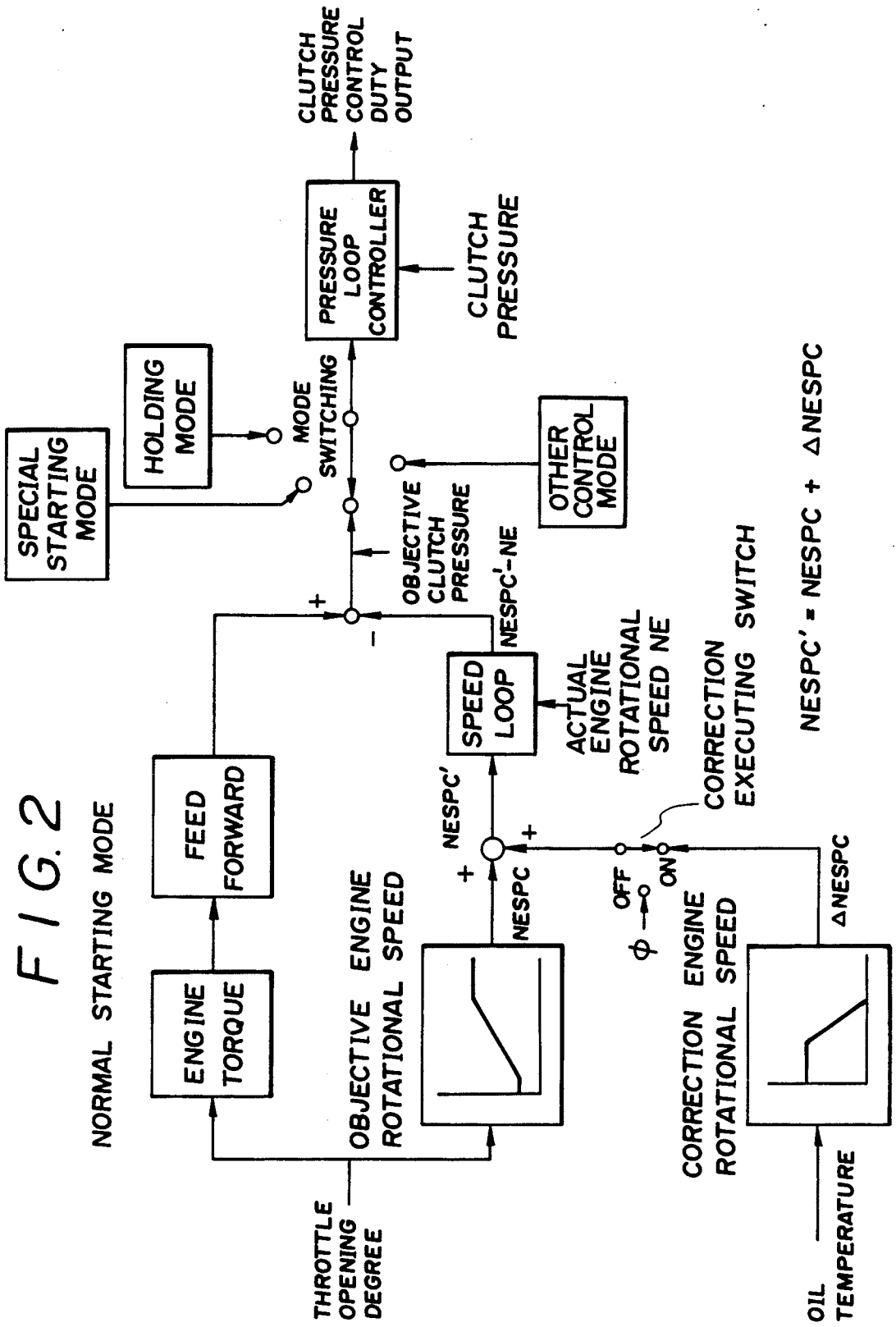
FIG. 2 is a conceptual block diagram of the control loop according to the invention.

As shown in FIG. 2, the correction executing switch is connected to "O" (OFF position) when the correction executing conditions are not satisfied and no correction is necessary. Under these conditions, the control section 104 calculates a feed forward amount from the engine torque value, and sets the final objective engine rotational speed NESPC' equal to the objective engine rotational speed NESPC. That is, NESPC'=NESPC+0. An actual engine rotational speed NE is fed back for comparison to the final objective engine rotational speed NESPC' by the speed loop, and the difference (NESPC'−NE) is calculated. The objective clutch pressure of the hydraulic clutch 68 is calculated from the feed forward amount and the above difference. The pressure loop is controlled by a pressure loop controller such that the actual clutch pressure in the various control modes is set to the objective clutch pressure. A driving signal is output to the third three-way electromagnetic valve 64 for controlling the clutch pressure.

If the predetermined correction executing conditions are satisfied, for instance, if the oil temperature is equal to or lower than a predetermined temperature when the normal starting mode is selected, the correction executing switch of FIG. 2 is switched ON by the control section 104 to thereby correct the objective engine rotational speed NESPC based on the oil temperature. That is, in the normal start mode, when the oil temperature is equal to or lower than the predetermined temperature, the correction executing switch is switched ON and the correction engine rotational speed ΔNESPC, which is set in accordance with the oil temperature, is added to the objective engine rotational speed NESPC, to arrive at the final objective engine rotational speed, NESPC'=NESPC+ΔNESPC The actual engine rotational speed is fed back to the final objective engine rotational speed NESPC' by the speed loop and the difference (NESPC'−NE) is calculated. The objective clutch pressure of the hydraulic clutch 68 is calculated from the feed forward amount and the difference (NESPC'−NE). The pressure loop is controlled by the pressure loop controller such that the actual clutch pressure in the normal starting mode is set to the objective clutch pressure. A driving signal is output to the third three-way electromagnetic valve 64 for controlling the clutch pressure. If the correction executing conditions are not satisfied, the final objective engine rotational speed NESPC' is directly set equal to the objective engine rotational speed NESPC, as discussed above.

Figure 3:
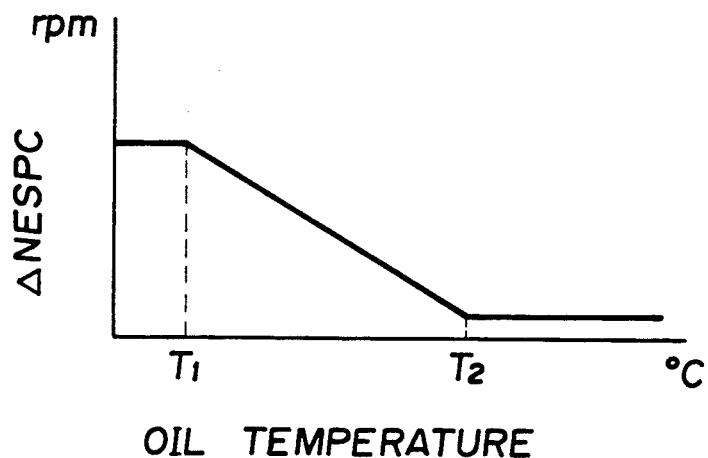
FIGS. 3 and 4 are explanatory diagrams which graphically illustrate two possible relationships between a correction engine rotational speed and engine oil temperature in the method of the present invention.
Figure 4:
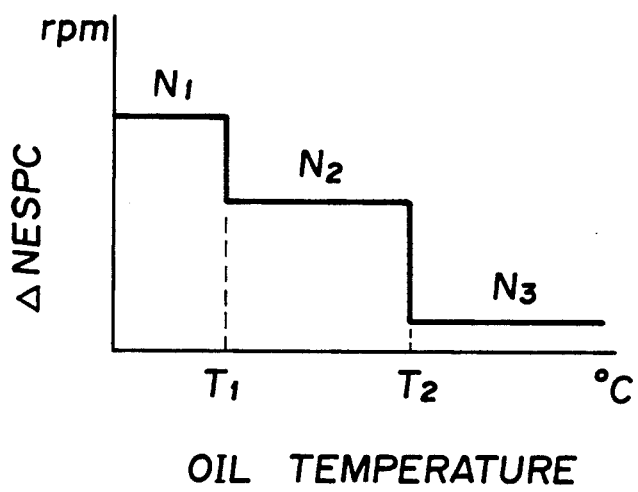

In the correction based on oil temperature, as shown in FIG. 3, the engine rotational speed can be set so as to exhibit a predetermined characteristic curve in a range of oil temperatures $T_1$ to $T_2$. On the other hand, as shown in FIG. 4, the correction engine rotational speed ΔNESPC for the trigger values $T_1$ and $T_2$ of oil temperature can be set to a predetermined constant value. The correction engine rotational speed can be selected and set in consideration of the control program, carburetor characteristics, and the like.

Figure 1:
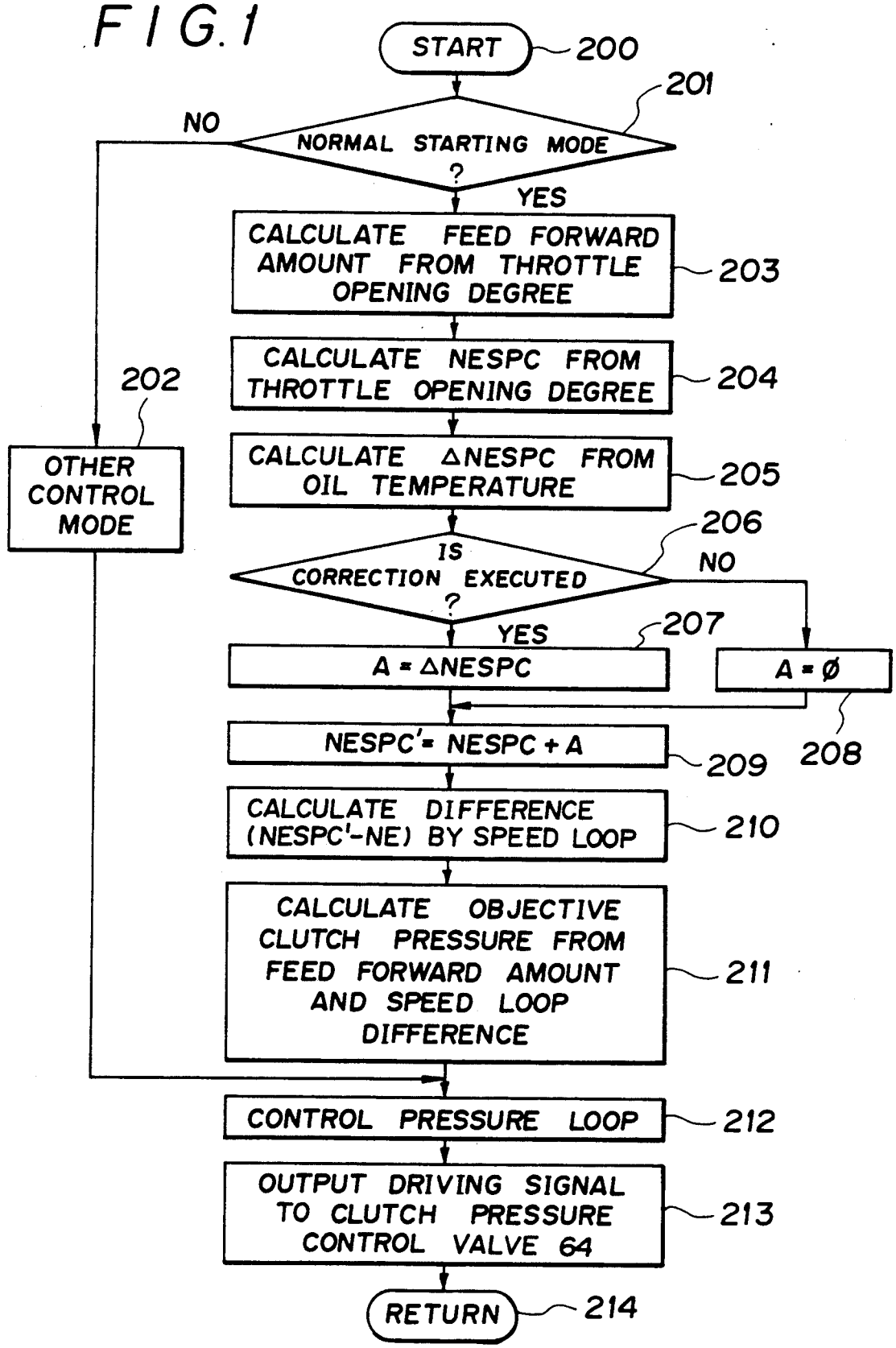
FIG. 1 is a control flowchart which illustrates the operation of the method according to the present invention.

The above control process will now be described in accordance with the flowchart of FIG. 1.

When the control is started (200), a check is made to see if the operating mode has been set to the normal starting mode or not (201). If it is not the normal starting mode (201: NO), the operation in the selected (other) control mode is executed (202) and the operation by a control pressure loop, which will be explained hereinlater, is performed (212) In the case of the normal starting mode (201: YES), the feed forward amount is calculated (203) from the engine torque value which is determined by the throttle opening degree. The objective engine rotational speed NESPC is calculated from the throttle opening degree (204). The correction engine rotational speed ΔNESPC is calculated from the oil temperature.

Then, a check is made to see if the correction executing conditions are satisfied or not (206). In the case of executing the correction (206: YES), the correction executing switch is switched ON and a correction value A is set equal to the correction engine rotational speed ΔNESPC (207). If the correction is not executed (206: NO), the correction value A is set to 0 (208).

The final objective engine rotational speed NESPC' is calculated from the objective engine rotational speed NESPC and the correction value A (209). The actual engine rotational speed NE is fed back for comparison to the final objective engine rotational speed NESPC', and the difference (NESPC'−NE) is calculated by the speed loop (210). The objective clutch pressure of the hydraulic clutch 68 is calculated (211) from the feed forward amount and the speed loop difference (NESPC'−NE), and the pressure loop is controlled such that the actual clutch pressure in the normal starting mode is set to the objective clutch pressure (212) A driving signal is output to the third three-way electromagnetic valve 64 for controlling the clutch pressure (213). Then, the processing routine is completed (214).

As mentioned above, in the case where the oil temperature is equal to or lower than the predetermined temperature when the various control modes are set into the normal starting mode, the control section 104 corrects the objective engine rotational speed NESPC based on the oil temperature. Thus, upon starting the vehicle in motion, a decrease in rotational speed of the engine, an abnormally high rotational speed, or the like can be avoided.

That is, at the start of the vehicle in motion after the engine was started at a low temperature, the clutch pressure is controlled so as to prevent reduction of the engine rotational speed below the fast idling rotational speed. Therefore, the vehicle can be smoothly started, and the feeling associated with the starting motion of the vehicle can be improved. By setting the correction engine rotational speed based on oil temperature, the program can be easily changed and the above method is practically advantageous.

In the disclosed embodiment, the correction executing condition has been defined in terms of oil temperature. However, the correction executing condition can also be defined so as to be satisfied when: the elapsed time after the start of the engine lies within a predetermined time; the throttle opening degree is equal to or smaller than a predetermined opening degree; the temperature of the engine cooling water is equal to or lower than a predetermined temperature; or the like. By switching the correction executing switch (FIG. 2) to any one of the various possible correction executing conditions, the desired type of correction can be selected.

On the other hand, when the objective engine rotational speed is set to a slightly high value, power is lacking at the start of motion of the vehicle. Therefore, it is desirable from the viewpoint of the feeling at the start of vehicle motion to reduce the correction engine rotational speed early.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method of controlling rotational speed of a continuously variable transmission in which each of a driving side pulley and a driven side pulley has a fixed pulley member and a movable pulley member which is supported relative to the fixed pulley member so that it can move toward and away from the fixed pulley member, and in which the driving side pulley is drivingly connected to an engine, including the steps of decreasing and increasing groove width between each pair of said fixed and movable pulley member to cause a rotational radius of a belt reeved between both of said pulleys to be respectively increased and decreased and thereby change the belt ratio of the transmission, the improvement comprising the steps of providing a hydraulic clutch which engages and disengages the transmission in response to a clutch pressure applied thereto to connect with and disconnect from a driving force which is output from the continuously variable transmission, providing a control section for (1) calculating an objective clutch pressure of the hydraulic clutch from (a) an engine torque value which is determined by a throttle opening degree and (b) an objective engine rotational speed, and (2) controlling actual clutch pressure in each of various selectable clutch control modes so as to correspond to the objective clutch pressure, and selectively using said control section to correct the objective engine rotational speed based on transmission oil temperature when the selected clutch control mode is a normal vehicle motion starting mode.

2. A method according to claim 1, wherein said step of selectively using said control section to correct the objective engine rotational speed includes the step of determining whether said transmission oil temperature is greater than a predetermined value.

3. A method according to claim 1, wherein said step of selectively using said control section to correct the objective engine rotational speed includes the step of comparing the throttle opening degree to a predetermined throttle opening degree value.

4. A method according to claim 1, wherein said step of selectively using said control section to correct the objective engine rotational speed includes the step of comparing engine cooling water temperature with a predetermined temperature value.

5. A method according to claim 1, wherein said step of selectively using said control section to correct the objective engine rotational speed includes the step of determining how much time has elapsed since the engine was started.

* * * * *